(12) United States Patent
Barsnick et al.

(10) Patent No.: US 6,779,803 B1
(45) Date of Patent: Aug. 24, 2004

(54) ERGONOMIC MATERIAL-HANDLING DEVICE

(75) Inventors: Lance E. Barsnick, Livermore, CA (US); David M. Zalk, San Jose, CA (US); Catherine M. Perry, Tracy, CA (US); Terry Biggs, Los Gatos, CA (US); Robert E. Tageson, San Ramon, CA (US)

(73) Assignee: The Regents of the University of California

( * ) Notice: Subject to any disclaimer, the term of this patent is extended or adjusted under 35 U.S.C. 154(b) by 501 days.

(21) Appl. No.: 09/664,674

(22) Filed: Sep. 19, 2000

(51) Int. Cl.$^7$ ................................................ B62B 1/04
(52) U.S. Cl. ................................ 280/47.315; 280/655.1
(58) Field of Search ................................ 280/651, 653, 280/654, 655, 655.1, 659, 47.131, 47.17, 47.18, 42, 47.24, 47.26, 47.27, 47.315, 47.34, 47.35, 47.371

(56) References Cited

U.S. PATENT DOCUMENTS

| | | | | |
|---|---|---|---|---|
| 1,772,951 A | * | 8/1930 | Klein | 280/47.28 |
| 2,497,440 A | * | 2/1950 | Denny | 214/100 |
| 2,579,639 A | * | 12/1951 | Adams | 280/53 |
| 2,600,577 A | * | 6/1952 | Roe | 254/131 |
| 2,902,286 A | * | 9/1959 | Wood, Jr. | 280/30 |
| 3,059,784 A | * | 10/1962 | Chamberlain et al. | 414/754 |
| 3,104,890 A | * | 9/1963 | Hill | 280/47.27 |
| 3,251,495 A | * | 5/1966 | Paton | 214/370 |
| 3,663,033 A | * | 5/1972 | Story | 280/47.27 |
| 3,820,807 A | * | 6/1974 | Curran | 280/47.3 |
| 3,829,113 A | * | 8/1974 | Epelbaum | 280/30 |
| 3,888,501 A | * | 6/1975 | McChesney | 280/47.18 |
| 4,211,309 A | * | 7/1980 | Ruggiero | 188/83 |
| 4,241,930 A | * | 12/1980 | Bell et al. | 280/47.29 |
| 4,286,796 A | * | 9/1981 | Esposito | 280/47.27 |
| 4,813,693 A | * | 3/1989 | Lockard et al. | 280/42 |
| 4,854,391 A | * | 8/1989 | Johnson | 172/354 |
| 4,910,893 A | * | 3/1990 | Asay | 37/281 |
| 5,393,081 A | * | 2/1995 | Mortenson | 280/47.27 |
| 5,564,720 A | * | 10/1996 | Stringer | 280/30 |
| 5,692,761 A | * | 12/1997 | Havlovitz | 280/33.994 |
| D395,110 S | * | 6/1998 | O'Neal et al. | D34/24 |
| 5,839,739 A | * | 11/1998 | Shannon et al. | 280/47.35 |
| 6,039,332 A | * | 3/2000 | Austin | 280/47.17 |
| 6,161,861 A | * | 12/2000 | Ivie | 280/655 |

* cited by examiner

Primary Examiner—Brian L. Johnson
Assistant Examiner—Bridget Avery
(74) Attorney, Agent, or Firm—James S. Tak; Alan H. Thompson; Eddie E. Scott

(57) ABSTRACT

A hand-held ergonomic material-handling device capable of moving heavy objects, such as large waste containers and other large objects requiring mechanical assistance. The ergonomic material-handling device can be used with neutral postures of the back, shoulders, wrists and knees, thereby reducing potential injury to the user. The device involves two key features: 1) gives the user the ability to adjust the height of the handles of the device to ergonomically fit the needs of the user's back, wrists and shoulders; and 2) has a rounded handlebar shape, as well as the size and configuration of the handles which keep the user's wrists in a neutral posture during manipulation of the device.

16 Claims, 7 Drawing Sheets

ERGONOMIC MATERIAL-HANDLING DEVICE

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to hand-held material-handling devices, particularly to an ergonomic material-device for moving heavy or large objects, and more particularly to an ergonomic material-handling device constructed so as to be used with neutral postures of the back, shoulders, wrists, and knees of the user.

Various types of hand-held material-moving devices, commonly known as hand trucks, have been developed for different applications. These prior material-carrying devices vary from small collapsible devices for carrying small items such as suitcases, etc., to large devices for carrying heavy or bulky items, such as the conventional 55 gallon gasoline drums and large/heavy boxes. One of the top causes of lost work time injuries is associated with material handling, and thus material-handling devices have been developed for moving heavy objects such as large waste containers and other large objects or smaller but heavy objects such as 5 gallon containers. However, these prior material-handling devices, in general, have not been constructed ergonomically so as to reduce the risk of a potential injury to the user.

The present invention provides a solution to the potential injury problems associated with material handling, by an ergonomically constructed material-handling device for moving heavy and/or large objects. The material-handling device of this invention can be used with neutral postures of the back, shoulders, wrists, and knees of the user thus significantly reducing injury potential. The device of this invention involves the use of adjustable height handles to afford a neutral posture of the back and shoulders as well as handles which are curved, similar to bicycle handlebars, to keep wrists in a neutral posture during manipulation of the device.

SUMMARY OF THE INVENTION

It is an object of the present invention to provide an ergonomic material-handling device.

A further object of the invention is to provide an ergonomically adapted, hand-held material-handling device capable of moving heavy and/or large objects.

Another object of the invention is to provide an ergonomically constructed material-handling device that can be used with neutral postures of the user's back, shoulders, wrists, and knees.

Another object of the invention is to provide a material-handling device that incorporates adjustable height, curved handles for preventing potential injury to the user.

Other objects and advantages of the present invention will become apparent from the following description and accompanying drawings. Basically, the present invention involves a hand-held ergonomic material-handling device. The invention involves an ergonomically adapted material-handling device capable of moving heavy objects, such as large waste containers and other large objects requiring mechanical assistance. Additionally, it can be adapted to virtually any material-handling device. There are two key features to this ergonomically adapted material-handling device. The first ergonomic adaptation gives the user the ability to adjust the height of the handles to ergonomically fit the needs of the user's back, wrists, and shoulders. The second ergonomic adaptation is the rounded handlebar shape, similar to bicycle handlebars as well as the size and configuration of the handles which keeps the user's wrists in a neutral posture during the required manipulation of the material-handling device.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to an ergonomically adapted material-handling device capable of effectively and safely moving heavy objects by users of various heights. The material-handling device is referred to hereinafter as a dolly. The invention basically comprises an adjustable handle assembly which can be constructed to be attached as the handle section of the frame assembly of any dolly regardless of size or carrying capacity capability and is particularly applicable for any dolly constructed to move heavy objects such as large (e.g. 55 gal.) waste containers or other large objects requiring mechanical assistance. There are two key features of the ergonomic adjustable handle assembly of this invention: 1) gives the user the ability to adjust the height of the handles to ergonomically fit the needs of the user's back, wrists, and shoulders; 2) the curved handlebar shape enables the user's wrists and arms to be in a natural (straight) position during utilization.

Figures 1, 2:
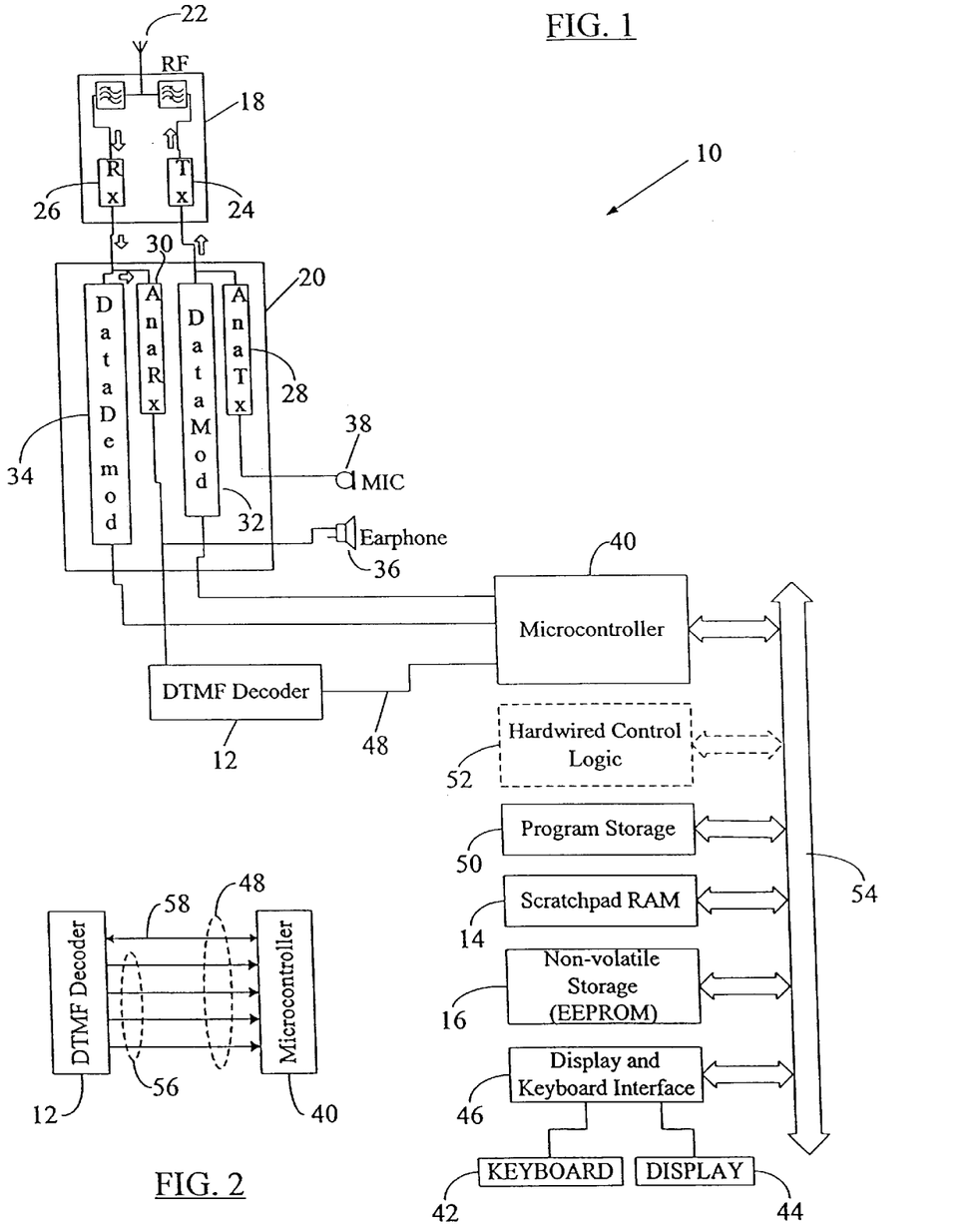
FIGS. 1, 2, and 3 illustrate an embodiment of a material-handling device which includes the ergonomic handle of this invention being used by persons of different heights, with the adjustable handle being in three different positions.
Figures 1, 2, 3:
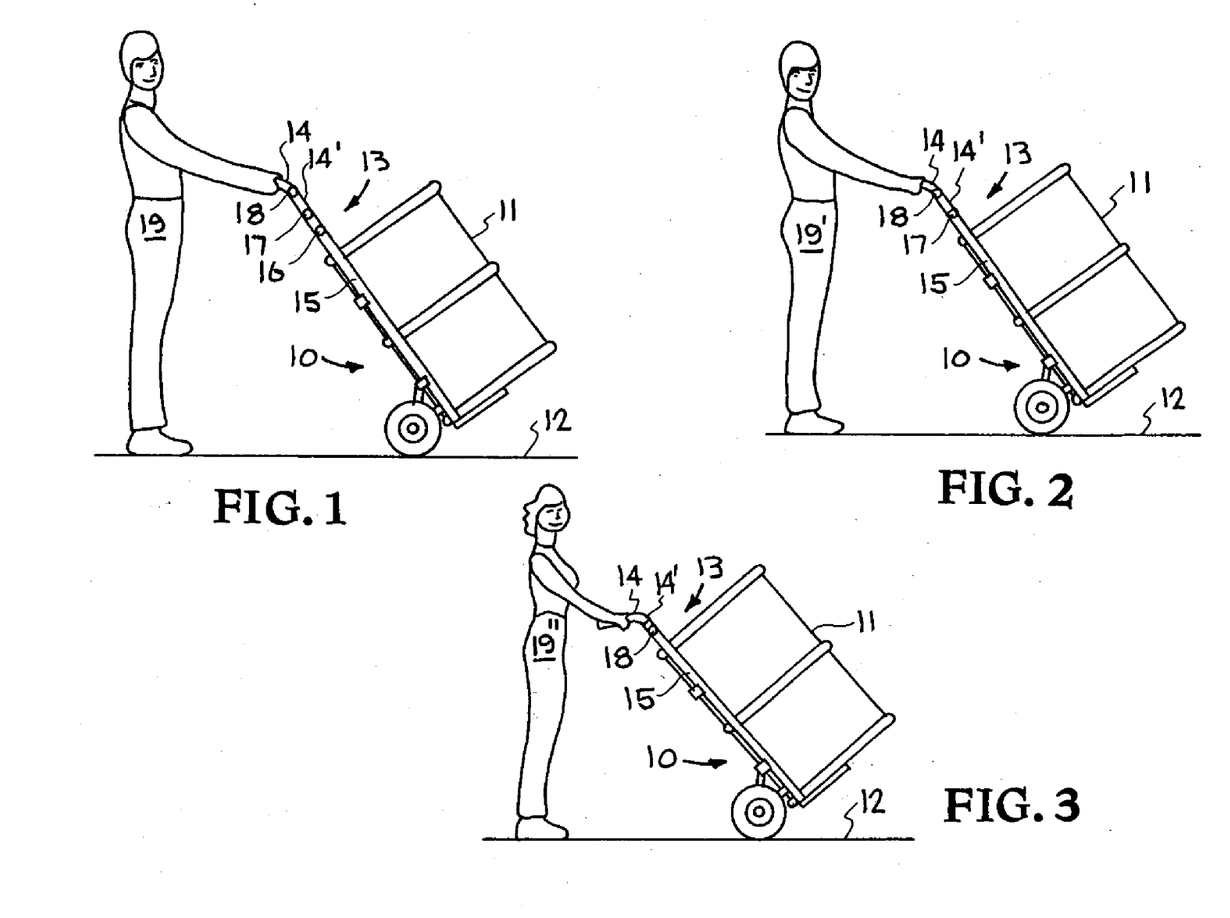
Figure 3:
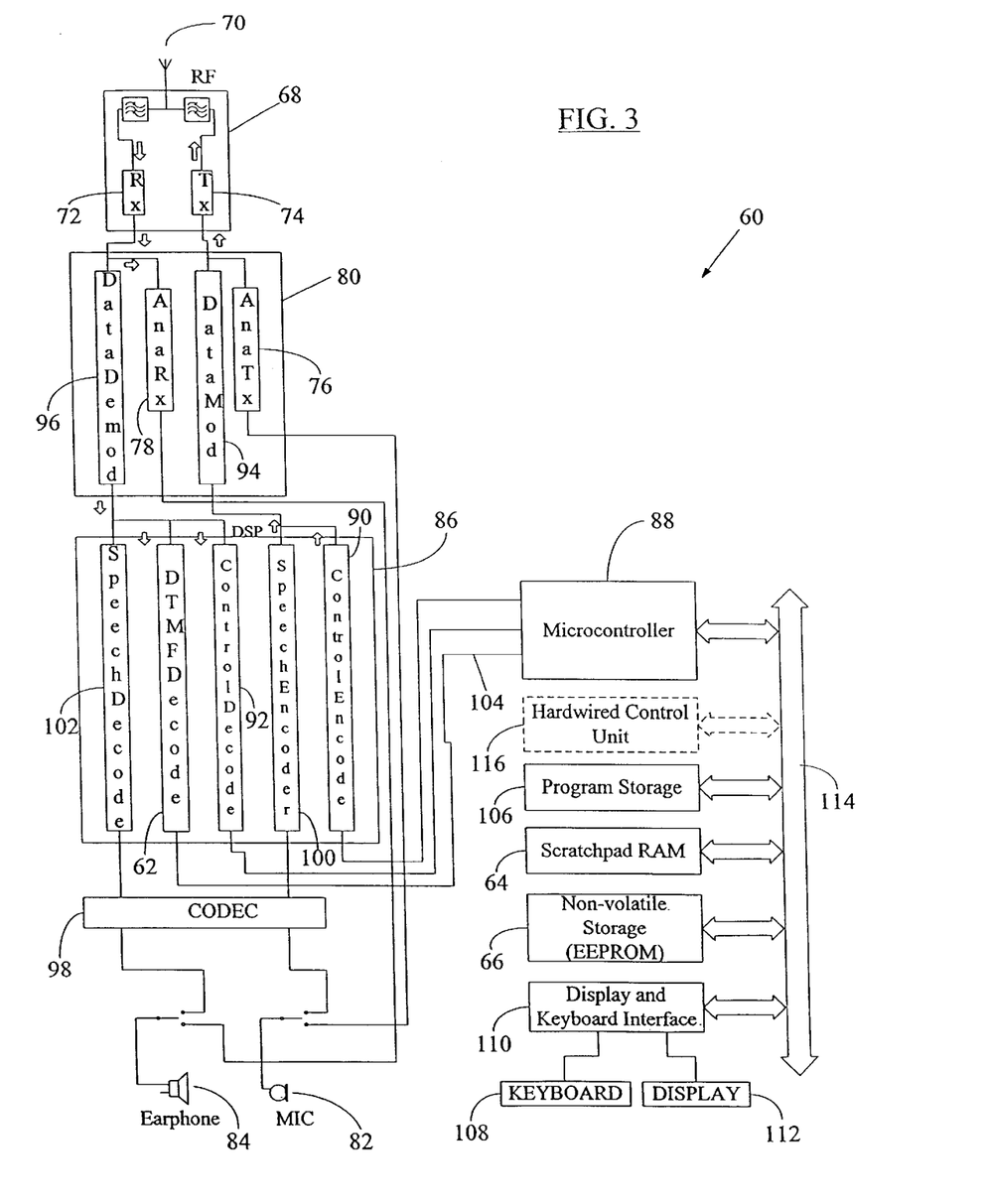
Figure 5:
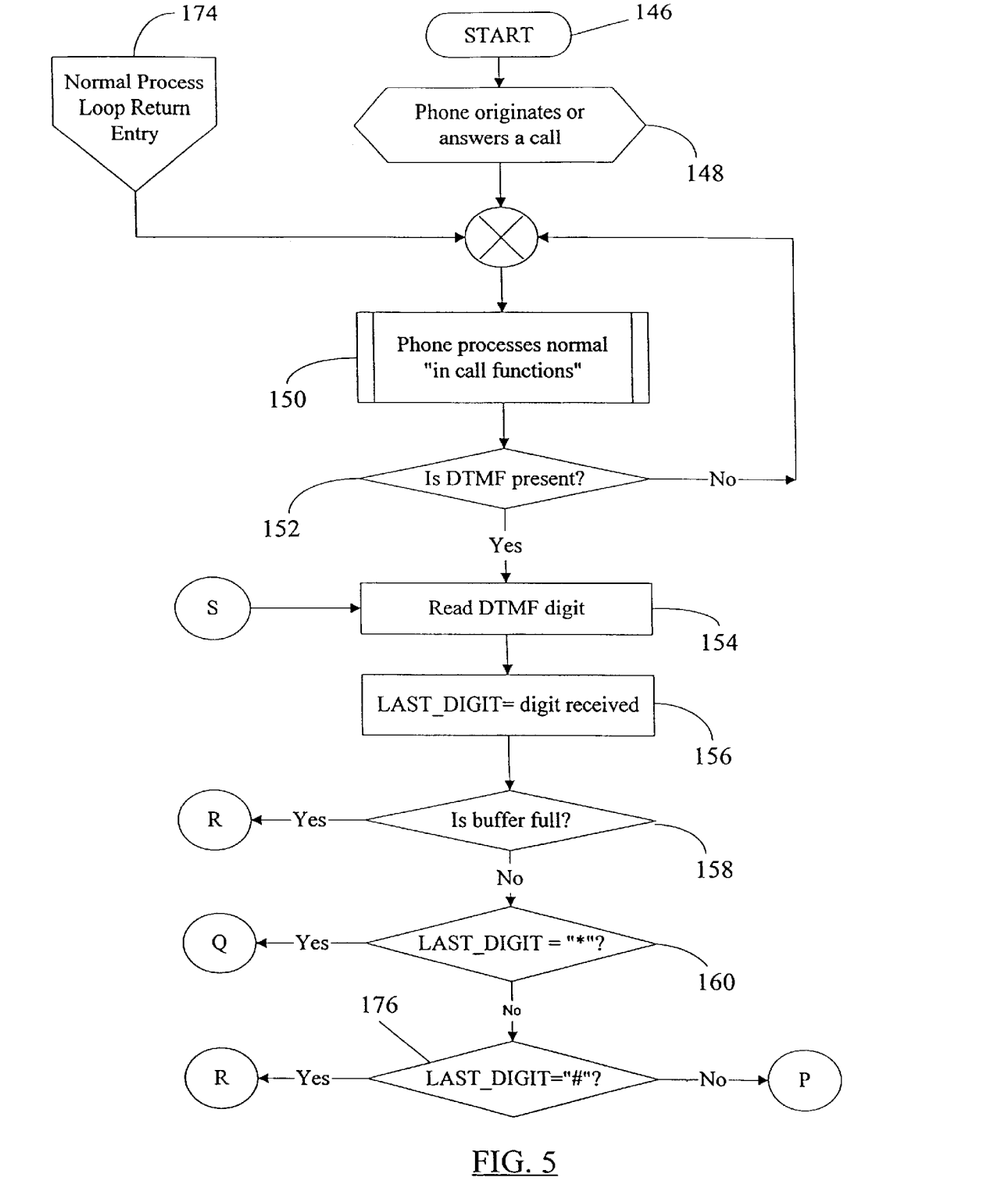
FIG. 5 is a cross-section of the frame and adjustable handle of FIG. 4, with an embodiment of a removable handle-positioning pin.
Figures 5, 6:
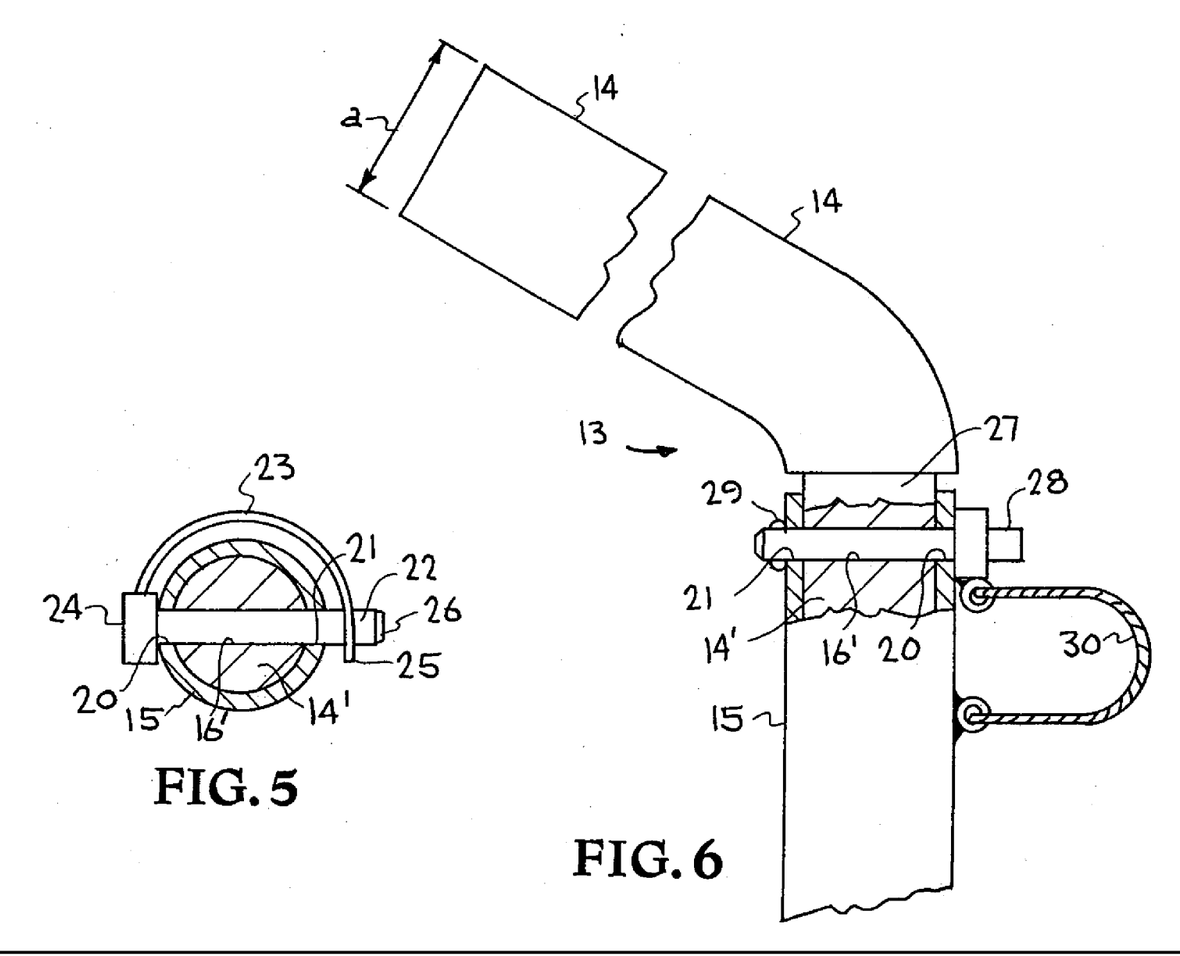
FIG. 6 is a view, partially in cross-section, of the frame and details the adjustable handle positioned in the frame by another embodiment of a removable positioning pin.
Figure 6:
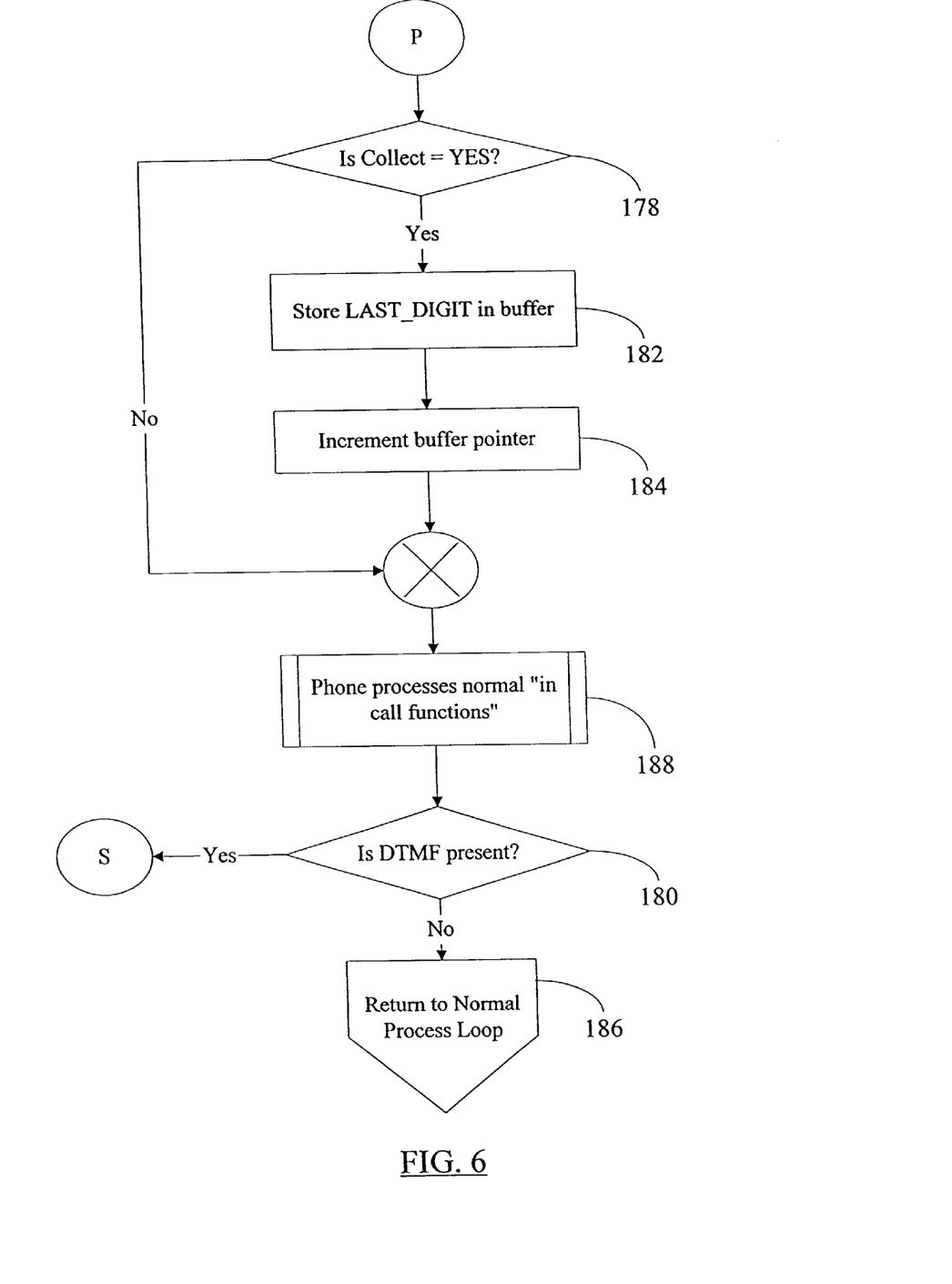

Referring now to the drawings, FIGS. 1, 2, and 3 illustrate an embodiment of the invention positioned on a dolly generally indicated at 10 designed to carry a drum 11 for moving the drum 11 along a surface 12 and includes a frame assembly mounted on wheels. The adjustable handle assembly, generally indicated at 13 includes handlebars 14 positioned in the dolly frame members 15 in three adjustment positions 16, 17, and 18. In FIG. 1, the handlebars 14 (only one shown) include a stem 14' secured to dolly frame member 15 at position 16 via removable pins, as shown in FIGS. 5 and 6, to enable ergonomic use by a tall user 19 having a height of 6'0", for example. In FIG. 2, the handlebar stem 14' is secured to dolly frame member 15 at position E17 to enable ergonomic use by a medium height user 19', having a height of 5'6", for example. FIG. 3 illustrates the handlebar stem 14' located in position 18 in dolly frame member 15 to enable ergonomic use by a short user 19" having, for example, a height of 5'0". Thus the adjustable handle assembly of the present invention can be positioned to ergonomically fit users of various heights. As shown hereinafter, the handlebars 14 are configured to fit the user's back, wrists, and shoulders to provide a normal or natural position, as can be seen in FIGS. 1–3.

Figure 4:
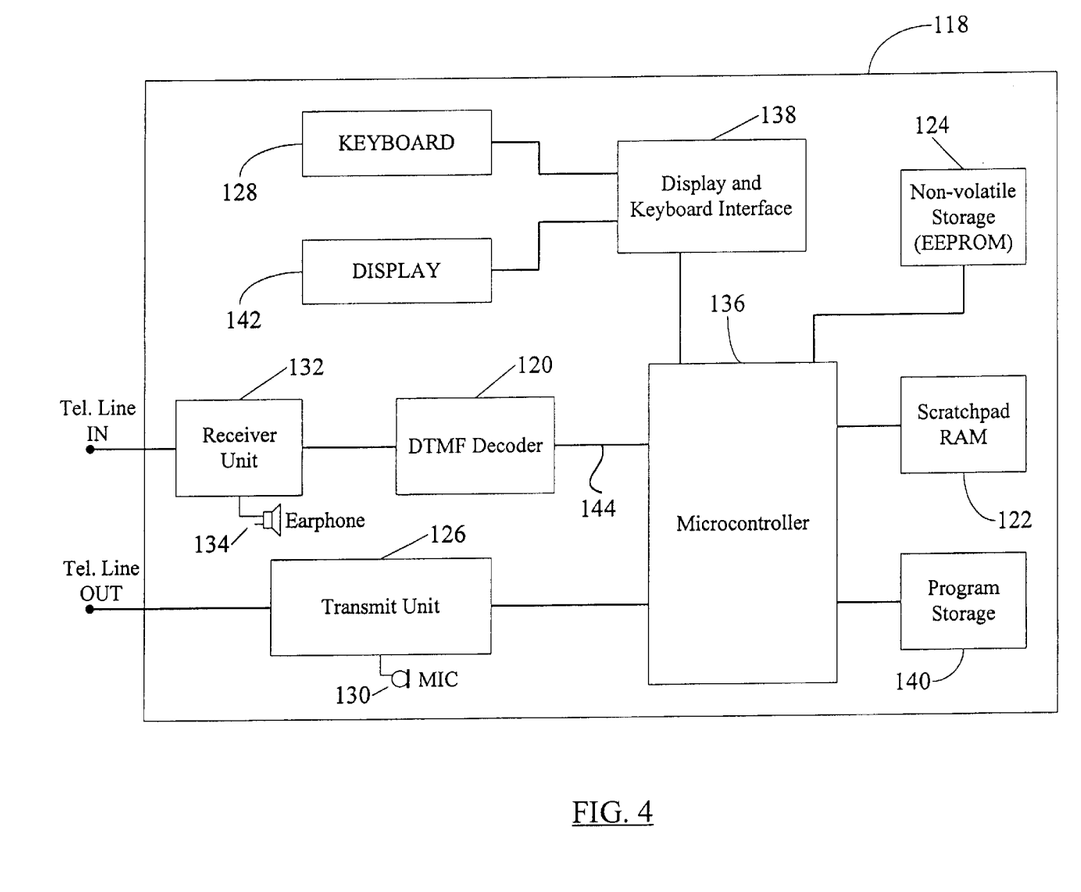
FIG. 4 illustrate a portion of a frame of the material-handling device with the adjustable handle stem of the present invention located therein.

FIG. 4 is a view of a frame member 15 of dolly 10 and a solid handlebar stem 14' illustrating openings 16', 17', and 18' formed in stem 14 and which conform to positions 16,17, and 18 in FIGS. 1–3. Handlebar stem 14' could also be hollow. As seen in FIG. 4, the openings are spaced by a distance which, for example, may be two inches. Thus the height of the handle assembly 13 may be adjusted over a range of four inches. It is recognized that a larger number than three positions of the handle assembly 13 may be formed by either lengthening the stem 14 and adding more openings or changing the distance d.

FIG. 5 shows in cross-section the dolly frame member 15 and a handle stem 14', such as shown in FIGS. 1–4. Frame member 15 includes a pair of aligned openings 20 and 21 which are adapted to align with opening 16', for example, of openings 16', 17' or 18' in handle stem 14', and a positioning pin 22 extends therethrough opening 20, opening 16' and opening 21, and is secured therein by a spring wire pin lock 23 secured to a head 24 of pin 22, and includes an opening 25 which fits over end 26 of pin 22.

FIG. 6 illustrates an embodiment of the adjustable handle assembly 13 of FIGS. 1–3 wherein the handlebars 14 (only one shown) are hollow and the handle stem 14' is solid, the handle stem 14' being secured in handlebar 14 as by welding, etc. In this embodiment the hollow handlebar 14 has a diameter (indicated at arrow a) of 1¹⁵⁄₁₆ to 2.0 inches, for example, with the diameter of the stem 14' being configured to fit within the end of handlebar 14 and to extend within the end of hollow frame member 15. It is recognized that the diameter of end of stem 14' indicated at 27, extending into frame member 15 may be different than the diameter thereof extending into handlebar 14, such that the assembly 13 can be mounted to various dolly frame arrangements which, in general, utilize hollow frame members as shown in FIG. 6. In the embodiment of FIG. 6, a ball detent type positioning pin 28 having detents 29 is utilized, and is attached via a safety cable 30 to dolly frame member 15, with the openings of frame member 15 and stem 14' being as shown in FIG. 5.

Figure 7:
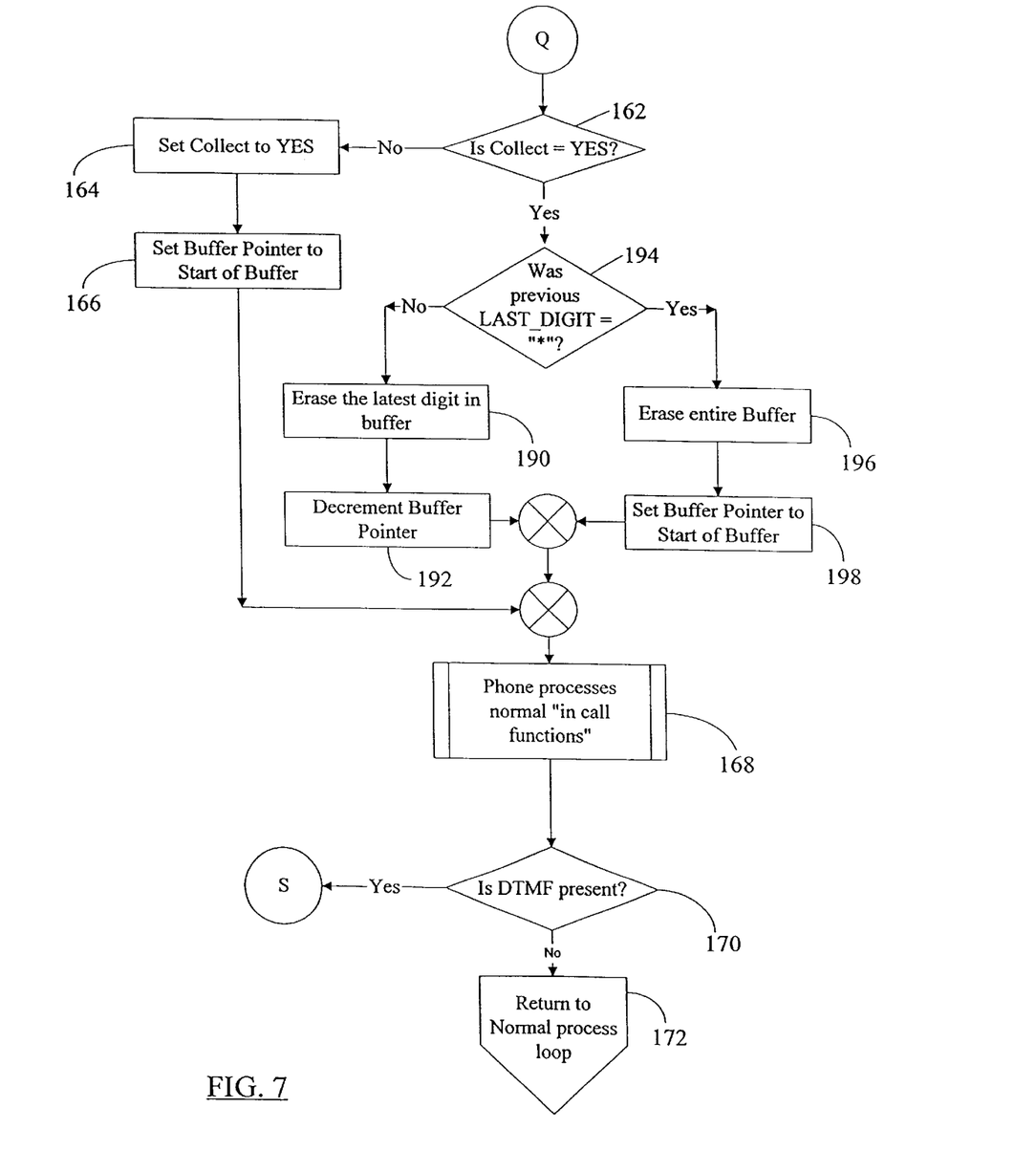
FIG. 7 is a front view of the adjustable ergonomic handle of the present invention positioned in the frame of the embodiment of FIGS. 1–3 of the material-handling device.
Figure 8:
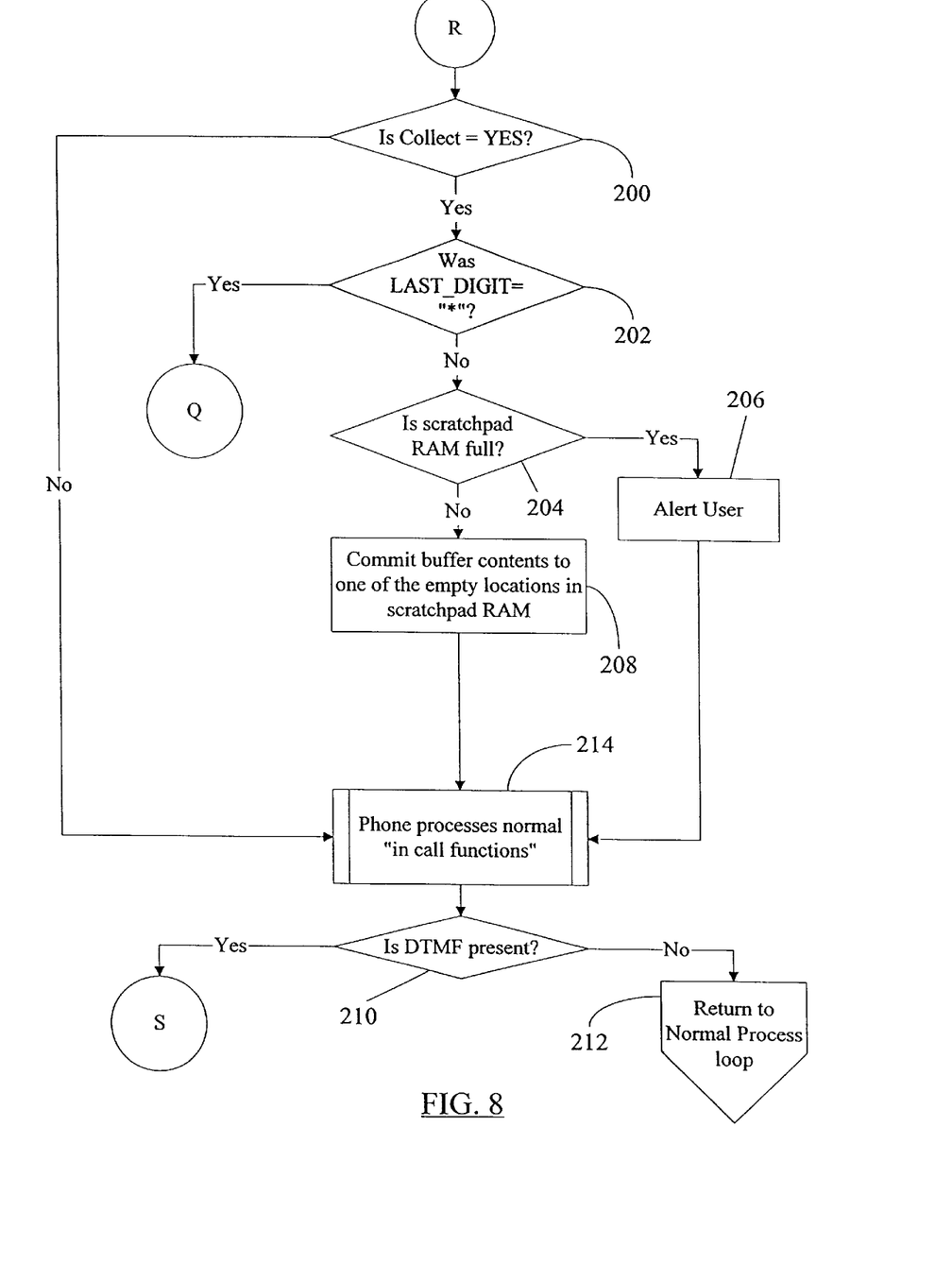
FIG. 8 is a top view of FIG. 7 showing the angle of the adjustable handle relative to a front plane of the frame of the device.

FIGS. 7 and 8 illustrate front and top views of the ergonomically adjustable handle assembly of the present invention as mounted on the dolly, as in FIG. 3, wherein the handle stems 14' of handlebars 14' are mounted in frame member 15 of dolly 10 in position 18. As seen in FIGS. 7 and 8, the embodiment of the dolly 10 additionally includes a central frame member 15' and a curved back brace or member 31. The handlebars 14 include straight end sections 32 and 33 interconnected by a curved section 34, as seen in FIG. 7, the curvature of section 34 ranging from 35° to 40°. As seen in FIG. 8, the handlebars 14 extend at an angle, as indicated by arrow b, with respect to a front plane of dolly 10 as indicated at 35. For example, the angle be is 6°, but may vary from 5° to 10°. The handlebars may have a diameter of ¾ inch to 1.0 inch O.D.

It has thus been shown that the present invention provides an ergonomic material-handling device, or dolly, which comprises a handle assembly that may be constructed to be mounted to a frame of any dolly having hollow handle/frame members. Also, the invention can be mounted to a dolly having a solid frame handle members by modifying the adjustable handle assembly to include hollow stems that would be mounted over the ends of the solid dolly frame members, with the positioning openings and positioning pin arrangements being as described above. Thus, the invention provides a solution for injuries to wrist, shoulder, or back associated with handling heavy materials with a dolly. Some applications of the dolly are for 30, 55 and 85-gallon containers and other heavy items whereby the adjustable handle assembly of the present invention enables safe movement of such items by users of various heights and physical structures.

While particular embodiments, parameters, etc., have been illustrated and/or described to exemplify and teach the principles of the invention, such are not intended to be limiting. Modifications and changes may become apparent to those skilled in the art, and it is intended that the invention be limited only by the scope the appended claims.

What is claimed is:

1. An ergonomic material-handling device comprising:
   frame assembly mounted on a plurality of wheels; and
   a handle assembly adjustable mounted to said frame assembly,
   said handle assembly comprising a pair of curved handlebars,
   said curved handlebars extending downwardly and also extend outwardly at an angle with respect to a front plane of said frame assembly,
   wherein said outwardly extending angle is in the range of 5° to 10°.

2. The device of claim 1, wherein said curved handlebars includes a section having a plurality of space openings extending therethrough,
   said plurality of spaced openings being adapted to align with, and be mounted to, an opening in a frame member of said frame assembly.

3. An ergonomic material-handling device comprising:
   frame assembly mounted on a plurality of wheels; and
   a handle assembly adjustable mounted to said frame assembly,
   said handle assembly comprising a pair of curved handlebars,
   said curved handlebars extending downwardly and also extend outwardly at an angle with respect to a front plane of said frame assembly,
   wherein said curved handlebars includes a section having a plurality of space openings extending therethrough, said plurality of spaced openings being adapted to align with, and be mounted to, an opening in a frame member of said frame assembly, and
   wherein each of said curved handlebars includes straight end sections and a curved center section, said openings being located in one of said straight end sections.

4. The device of claim 3, wherein said one of said end sections of each of said handlebars includes a handle stem mounted thereto, said openings being located in said handle stem.

5. The device of claim 3, wherein each of said handlebars is of a hollow construction, wherein said handle stem is composed of a member constructed from the group consisting of solid members and hollow members, and wherein said handle stem is fixedly secured to said straight section of said handlebar.

6. The device of claim 3, additionally including removable pins for mounting each of said curved handlebars to a frame member.

7. The device of claim 5, additionally including removable pins for mounting said handle stems of said handlebars to said frame member via said opening in said frame member and one of said openings in said handle stems.

8. The device of claim 6, additionally including means for preventing removal of said pins from said curved handlebars.

9. The device of claim 6, additionally including a member secured to a removable pin and to a frame member.

10. The device of claim 7, wherein said removable pins are provided with means for securing said pins in said opening.

11. The device of claim 10, wherein said means is connected to said frame member.

12. An ergonomic material-handling device comprising:

frame assembly mounted on a plurality of wheels; and a handle assembly adjustable mounted to said frame assembly, said handle assembly comprising a pair of curved handlebars, said curved handlebars extending downwardly and also extend outwardly at an angle with respect to a front plane of said frame assembly, wherein each of said handlebars includes a hollow section and a solid end section, said solid end section being constructed to be mounted in an end of a frame member of said frame assembly.

13. In a dolly for moving items having a frame mounted on a pair of wheels and a handle section for moving said dolly, the improvement comprising:

a handle section having a pair of handlebars curved downwardly and outwardly and adjustably mounted to members of said frame, and extending at an angle from a front plane of said frame, said angle being about 5°–10°, and said handlebars having a curvature in the range of 35° to 40°.

14. The improvement of claim 13, wherein said curved handlebars are adjustably mounted to said frame members by removable pins extending through said frame members and through an end of said curved handlebars.

15. The improvement of claim 13, wherein said curved handlebars each includes handle stems mounted thereto and adapted to be removably mounted to a frame member.

16. The improvement of claim 14, wherein at least said end of each of said curved handlebars is composed of a solid material.

\* \* \* \* \*

UNITED STATES PATENT AND TRADEMARK OFFICE
CERTIFICATE OF CORRECTION

PATENT NO. : 6,779,803 B1
DATED : August 24, 2004
INVENTOR(S) : Barsnick et al.

It is certified that error appears in the above-identified patent and that said Letters Patent is hereby corrected as shown below:

The title page showing the illustrative figure should be deleted to be replaced with the attached title page.

Drawing sheets, consisting of Figs. 1-8, should be deleted to be replaced with the drawing sheets, consisting of Figs. 1-8, as shown on the attached page.

Signed and Sealed this

Twenty-fifth Day of January, 2005

JON W. DUDAS
*Director of the United States Patent and Trademark Office*

(12) United States Patent
Barsnick et al.

(10) Patent No.: US 6,779,803 B1
(45) Date of Patent: Aug. 24, 2004

(54) ERGONOMIC MATERIAL-HANDLING DEVICE

(75) Inventors: Lance E. Barsnick, Livermore, CA (US); David M. Zalk, San Jose, CA (US); Catherine M. Perry, Tracy, CA (US); Terry Biggs, Los Gatos, CA (US); Robert E. Tageson, San Ramon, CA (US)

(73) Assignee: The Regents of the University of California

( * ) Notice: Subject to any disclaimer, the term of this patent is extended or adjusted under 35 U.S.C. 154(b) by 501 days.

(21) Appl. No.: 09/664,674

(22) Filed: Sep. 19, 2000

(51) Int. Cl.$^7$ .................................................. B62B 1/04
(52) U.S. Cl. ............................ 280/47.315; 280/655.1
(58) Field of Search .......................... 280/651, 653, 280/654, 655, 655.1, 659, 47.131, 47.17, 47.18, 42, 47.24, 47.26, 47.27, 47.315, 47.34, 47.35, 47.371

(56) References Cited

U.S. PATENT DOCUMENTS

| | | | | | |
|---|---|---|---|---|---|
| 1,772,951 A | * | 8/1930 | Klein | ................... | 280/47.28 |
| 2,497,440 A | * | 2/1950 | Denny | ................... | 214/100 |
| 2,579,639 A | * | 12/1951 | Adams | ................... | 280/53 |
| 2,600,577 A | * | 6/1952 | Roe | ................... | 254/131 |
| 2,902,286 A | * | 9/1959 | Wood, Jr. | ................... | 280/30 |
| 3,059,784 A | * | 10/1962 | Chamberlain et al. | ...... | 414/754 |
| 3,104,890 A | * | 9/1963 | Hill | ................... | 280/47.27 |
| 3,251,495 A | * | 5/1966 | Paton | ................... | 214/370 |
| 3,663,033 A | * | 5/1972 | Story | ................... | 280/47.27 |
| 3,820,807 A | * | 6/1974 | Curran | ................... | 280/47.3 |
| 3,829,113 A | * | 8/1974 | Epelbaum | ................... | 280/30 |
| 3,888,501 A | * | 6/1975 | McChesney | ................... | 280/47.18 |
| 4,211,309 A | * | 7/1980 | Ruggiero | ................... | 188/83 |
| 4,241,930 A | * | 12/1980 | Bell et al. | ................... | 280/47.29 |
| 4,286,796 A | * | 9/1981 | Esposito | ................... | 280/47.27 |
| 4,813,693 A | * | 3/1989 | Lockard et al. | ................... | 280/42 |
| 4,854,391 A | * | 8/1989 | Johnson | ................... | 172/354 |
| 4,910,893 A | * | 3/1990 | Asay | ................... | 37/281 |
| 5,393,081 A | * | 2/1995 | Mortenson | ................... | 280/47.27 |
| 5,564,720 A | * | 10/1996 | Stringer | ................... | 280/30 |
| 5,692,761 A | * | 12/1997 | Havlovitz | ................... | 280/33.994 |
| D395,110 S | * | 6/1998 | O'Neal et al. | ................... | D34/24 |
| 5,839,739 A | * | 11/1998 | Shannon et al. | ................... | 280/47.35 |
| 6,039,332 A | * | 3/2000 | Austin | ................... | 280/47.17 |
| 6,161,861 A | * | 12/2000 | Ivie | ................... | 280/655 |

* cited by examiner

*Primary Examiner*—Brian L. Johnson
*Assistant Examiner*—Bridget Avery
(74) *Attorney, Agent, or Firm*—James S. Tak; Alan H. Thompson; Eddie E. Scott (57) ABSTRACT

A hand-held ergonomic material-handling device capable of moving heavy objects, such as large waste containers and other large objects requiring mechanical assistance. The ergonomic material-handling device can be used with neutral postures of the back, shoulders, wrists and knees, thereby reducing potential injury to the user. The device involves two key features: 1) gives the user the ability to adjust the height of the handles of the device to ergonomically fit the needs of the user's back, wrists and shoulders; and 2) has a rounded handlebar shape, as well as the size and configuration of the handles which keep the user's wrists in a neutral posture during manipulation of the device.

16 Claims, 7 Drawing Sheets